United States Patent [19]

Birt

[11] 4,231,730
[45] Nov. 4, 1980

[54] MOULDING VIDEO DISCS

[75] Inventor: David E. Birt, London, England

[73] Assignee: E M I Limited, Middlesex, United Kingdom

[21] Appl. No.: 92,062

[22] Filed: Nov. 6, 1979

[30] Foreign Application Priority Data

Nov. 25, 1978 [GB] United Kingdom ............... 46071/78

[51] Int. Cl.² ................. B29C 3/00; B29C 17/00; B29D 17/00
[52] U.S. Cl. ................. 425/385; 425/810; 425/411
[58] Field of Search .............. 425/383, 384, 385, 406, 425/407, 411, DIG. 44, 810

[56] References Cited

U.S. PATENT DOCUMENTS

| | | |
|---|---|---|
| 2,578,209 | 12/1951 | Schwarz ............... 425/394 X |
| 2,841,083 | 7/1958 | Kirkpatrick et al. ............. 425/810 |
| 2,998,622 | 9/1961 | Renoux ............... 425/810 |
| 3,819,315 | 6/1974 | Borchard et al. ............. 425/810 |
| 3,830,459 | 8/1974 | Strausfeld ............... 425/810 |
| 3,918,875 | 11/1975 | Phillipson et al. ............. 425/810 |
| 3,945,790 | 3/1976 | Puech ............... 425/810 |
| 4,185,955 | 1/1980 | Holmes et al. ............. 425/810 |

FOREIGN PATENT DOCUMENTS 1074607 7/1967 United Kingdom ............... 425/810

Primary Examiner—J. Howard Flint, Jr.
Attorney, Agent, or Firm—Fleit & Jacobson

[57] ABSTRACT

A means for moulding thermoplastics video discs having one or two shaped resilient compensators to maintain the stamper plates in parallelism with the plastics foil during moulding. The compensators may be of a rubber and may contain a thermally conductive material.

10 Claims, 1 Drawing Figure

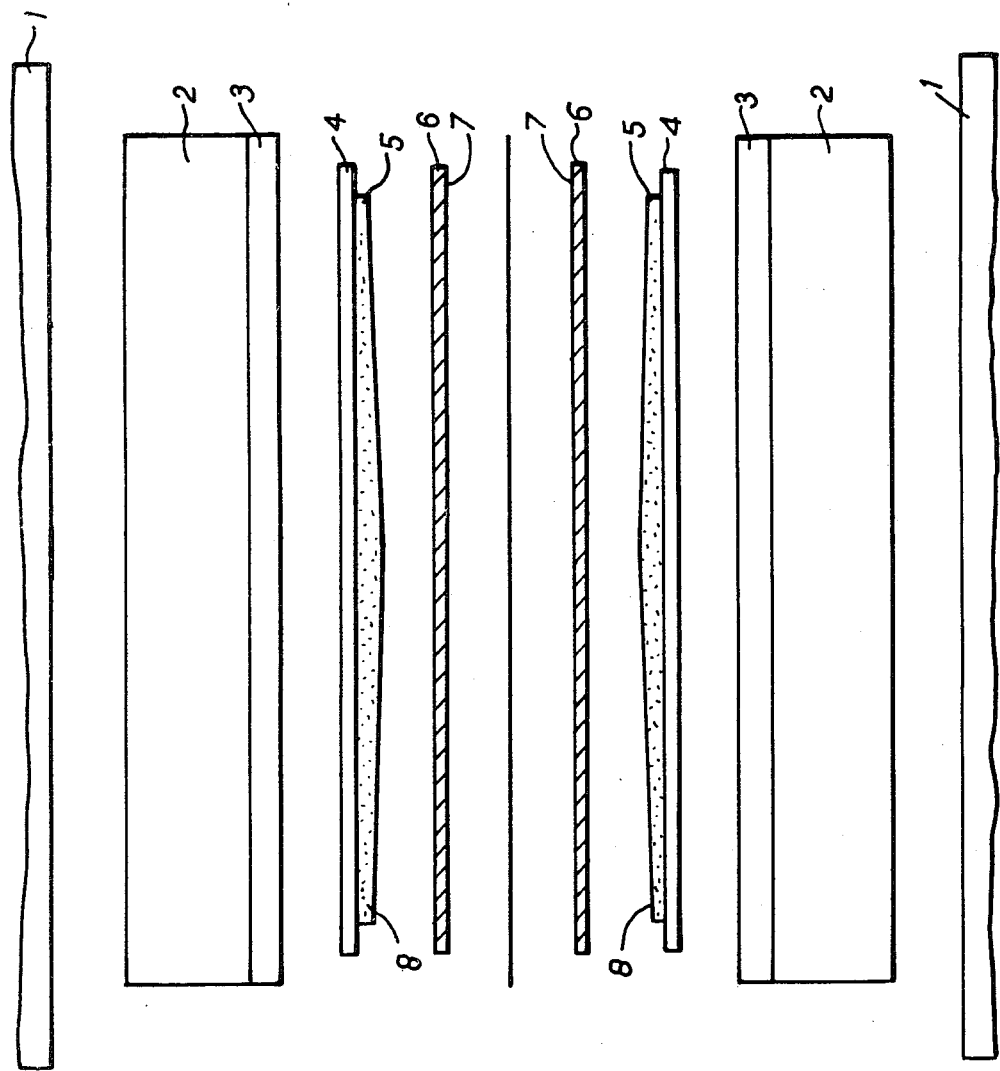

MOULDING VIDEO DISCS

This invention relates to the pressing of thermoplastics video discs.

Techniques for moulding thermoplastics materials in contact with a heated stamper, carrying an impression of information or data, are well known in the manufacture of audio frequency records.

As in the case of audio, video frequency data is recorded on a stamper in the form of a relief structure, but on a microscopic scale, usually having the form of an arrangement of holes with diameters of no more than a few microns. In consequence, the requirements for transferring such recorded data to a plastics foil in a moulding operation are far more exacting than those hitherto necessary for audio frequency recording.

In particular, for the faithful reproduction of a video recording, it is vitally important that the moulded plastics foil should exhibit no short wavelength (of the order of microns) irregularities in general flatness, and for this reason the foil should be maintained in excellent parallelism with the stamper plates in the press during the moulding operation. Great care is, of course, taken to machine and set each element of the press assembly, to provide as perfect parallelism of the stamper plates as possible. Short wavelength irregularities in flatness of the order of 5–10 microns inevitably persist, however, and the moulding of high fidelity video information onto the surface of a plastics foil cannot be achieved with a reasonable degree of success unless a resilient material member, or a compensator, as it is sometimes known, is provided to ensure a uniform application of pressure to the stamper plates to offset any lack of parallelism due to the press assembly.

Such compensators are known, e.g. BP 1439266, and although they tend to improve the lack of parallelism inherent in the press, they fail to reduce a further source of short wavelength irregularity caused by pockets of air trapped between the plastics foil and stamper plates during moulding. Such pockets of trapped air can be particularly troublesome as they may also be responsible for the production of blank regions, extending many tens of microns, on a moulded foil.

It is an object of the present invention to provide a device for pressing a thermoplastics material having an improved form of compensation.

According to the invention there is provided an arrangement for impressing a surface of a thermoplastics foil with a relief structure, the arrangement comprising a pair of substantially parallel mould blocks, means for applying pressure to said mould blocks, a pair of substantially parallel stamper plates mounted between the mould blocks, at least one stamper plate bearing a negative impression of said relief structure, and interposed between an adjacent mould block and stamper plate a resilient material compensator, as hereinbefore defined, wherein at least one compensator has a convex surface, the ratio of the diameter of said surface to the depth thereof being no less than 340 and no greater than 3400, which arrangement is capable of impressing a thermoplastics foil positioned between the stamper plates.

The relief structure may be indicative of information or data. The device may include two compensators and each compensator may be shaped to contact a stamper plate substantially at its centre only, during the initial stages of pressing. The compensators may be shaped to be substantially spherical or conical in form.

As the applied pressure increases, the compensators conform more to the shape of the stamper plates thereby offsetting any irregularities therein, and expelling air trapped between the pressed plastics foil and the stamper plates, from the centre outwards.

In order to minimise stretch of the plastics foil during moulding the height at the centre of a shaped compensator should not be too different from that of its outer edge, but should be sufficiently large to permit trapped air between the foil and stamper to be expelled easily. It follows from the above that for a compensator 34 cms in diameter, the difference in heights should typically lie between 1 mm and 0.1 mm. One of the compensators may be a plastics sheet or a press paper, 50–100 microns in thickness, positioned between a mould block and stamper plate. The plastics sheet may be polytetrafluoroethylene although other resilient plastics may also be suitable.

The resilient material for compensators may be a rubber, such as a silicone rubber, and may be machined to the required shape. The material should be sufficiently resilient to conform easily under pressure, to the shape of the stamper plates and yet retain its shape when the pressure is released; but should also be sufficiently hard to adequately offset any irregularities in flatness. Materials having an I.R.H.D. (International Rubber Hardness Degrees) hardness in the range 60° to 75° should preferably be used and those having a hardness in the range 73° to 75° are found to be particularly useful.

The introduction of a rubber or other resilient material member into the press assembly inevitably inhibits the transport of heat from the mould blocks to the plastics foil, thereby increasing the cycle time for a moulding operation, typically from about 20 seconds to about 3 minutes. Such an increase may be tolerable, but economic considerations usually demand a fast moulding cycle, preferably of the order of 20 seconds. By loading the compensator with a thermally conductive material, the cycle time may be reduced to about 30 seconds.

Such a thermally conductive loading material may be carbon black, although other materials, a metallic powder for example, may be suitable. It is of course necessary to control the amount of loading material so that the required properties of resilience are retained. For example from 60 to 75% loading material may be used.

For a better understanding of the invention, and to illustrate a preferred embodiment, reference will be made to the accompanying drawing.

The drawing shows a schematic side elevation view of the press assembly. Referring to the drawing, a pair of steel mould blocks 2 are mounted between the top and bottom blocks, 1, of an hydraulic press. Each mould block has a cover plate, 3, which may also be of steel, cooper brazed to its inward facing surface and accurately machined to provide a uniform and parallel pair. The mould blocks incorporate a now standard five start spiral of the heating-cooling channel form, as described in BP. 1,437,175, to provide a uniformly heated moulding area of about 35 cms in diameter, adequate to effectively mould a 30 cms diameter foil. Sharp corners around the sides of the mould blocks, which can act as heat sinks causing a non uniform temperature distribution over the surface of the cover plate are, if necessary, removed.

Steam, obtained from a steam accumulator fed by a Stone Platt flash boiler, feeds the mould blocks via short armoured hose connectors at pressures of up to 200 psi and the cooling water is pumped to the mould blocks at pressures of up to 150 psi. The boiler and water pump, not shown in the diagram, are positioned as close to the mould blocks as is practicable to minimise the moulding cycle time.

Polished nickel stamper plates, 6, one at least carrying an impression of recorded information or data on its inward facing surface, 7, are mounted between the mould blocks and set to be accurately parallel with them.

A compensator, 5, is mounted between each moulding block and stamper plate. The compensators are made from 74° I.R.H.D. hard graphite loaded silicone rubber (75% by weight graphite) and cast under high pressure onto machined and polished mild steel plates. In an alternative example of the invention a compensator having an IRHD hardness in the range 60° to 75° may be used which may be loaded with no less than 60% and no more than 75% by weight of graphite, or alternatively a metallic powder. It has been found that although such loading has no noticable effect upon the thermal conductivity of the rubber at atmospheric pressure, in operation at high pressures, its effect, as mentioned above, is to considerably reduce the moulding cycle time, to about 30 secs. The rubber is ground to form a conical surface, 8, over a diameter of approximately 34 cms, the centre height being only 0.4 mm greater than at the outside diameter. In another example the depth of the surface may have an alternative value, in the range 0.1 mm to 1 mm. Other diameters may also, of course, be used but the ratio of the diameter of the surface to the depth thereof should typically lie in the range 340 to 3400.

In operation an upthrusting hydrostatic ram closes the blocks, 1, of the press at a slow predetermined rate, while steam is circulated around the mould blocks under pressure for about 10 seconds. The foil is moulded using a clamping force of about $180 \times 10^3$ kilograms at 125°–130° C. for about 30 seconds. After moulding the steam is replaced by cold water, cooling the mould block assembly to about 20° C., when the ram allows the press to open.

The foil used in the moulding of discs may be of polyvinylchloride (PVC) or a copolymer of PVC with polyvinyl acetate (PVCA) typically 150 microns thick, although a Mylar (RTM) foil typically 150 microns thick, having a PVC coating, 1 to 2 micron thick, is to be preferred. Mylar, having a better flex strength than PVC and, moreover, a very good dimensional stability, is mechanically a superior material for making video discs. Mylar is not easily moulded, however, and the PVC coated foil proves to be a very convenient material to use.

In the system used for making a video disc, the plastics foil, held under constant tension at a uniform temperature (typically 45° C.) is advanced to a position between the stamper plates to be moulded. When the press blocks open, the moulded foil advances to be gripped by vacuum chucks and cut into pieces of convenient length for flash trimming. Initially the disc is trimmed oversize (to approximately 31 cms diameter) and after the centre hole has been punched, the final flash is removed.

What I claim is:

1. An arrangement for impressing a surface of a thermoplastics foil with a relief structure, the arrangement comprising a pair of substantially parallel mould blocks, means for applying pressure to said mould blocks, a pair of substantially parallel stamper plates mounted between the mould blocks, at least one stamper plate bearing a negative impression of said relief structure, and interposed between an adjacent mould block and stamper plate a resilient material compensator, as hereinbefore defined, wherein at least one compensator has a convex surface, the ratio of the diameter of said surface to the depth thereof being no less that 340 and no greater than 3400, which arrangement is capable of impressing a thermoplastics foil positioned between the stamper plates.

2. An arrangement according to claim 1 wherein the said relief structure is indicative of information or data.

3. An arrangement according claim 1 or claim 2 wherein there are two compensators each having a convex surface.

4. An arrangement according to claims 1 or 2 wherein said convex surface is substantially spherical or conical.

5. An arrangement according to claim 1 or claim 2 wherein the at least one compensator is formed of rubber having an IRHD hardness in the range 60° to 75°.

6. An arrangement according to claim 5 wherein said IRHD hardness lies between 73° and 75°.

7. An arrangement according to claims 1 or 2 wherein said compensator is loaded with a thermally conductive material.

8. An arrangement according to claim 7 wherein the compensator is loaded with 60% to 75% by weight of said thermally conductive material.

9. An arrangement according to claims 7 wherein said thermally conductive material is carbon black or a metallic powder.

10. An arrangement according to claim 1 or claim 2 wherein the depth of said convex surface lies between 1 mm and 0.1 mm.

* * * * *